United States Patent Office 3,142,666
Patented July 28, 1964

3,142,666
ETHYLENE POLYMERIZATION UTILIZING TWO ORGANIC PEROXYGEN COMPOUNDS AS CATALYSTS
Oliver de S. Deex, Dayton, Lowell E. Erbaugh, Vandalia, and John M. Butler, Dayton, Ohio, assignors to Monsanto Company, a corporation of Delaware
No Drawing. Filed Mar. 5, 1959, Ser. No. 797,350
2 Claims. (Cl. 260—94.9)

This invention relates to the polymerization of ethylene to produce normally solid high molecular weight thermoplastic polymers of ethylene. In some aspects the invention provides methods for controlling the highly exothermic polymerization of ethylene as carried out continuously by a non-solvent process in a tubular reactor so as to obtain high conversions to polymers of ethylene having good density and tensile properties.

Polyethylene is an exceptionally important material of commerce. This thermoplastic normally solid material, which melts at temperatures generally above 110° C. and shows, by X-ray diffraction analysis, the presence of a crystalline phase, is essentially a linear polymer of ethylene of high molecular weight, usually 15,000 to 40,000 or higher, with controlled and limited branching and cross-linking of the polymer chains. Polyethylene has exceptional insulating qualities in electrical applications, and finds important use in such fields, especially where high frequency currents are involved, as in radar. Because of its flexibility at ordinary temperatures and its wide transition range, polyethylene is used in the molding of a large number of articles such as toys, kitchen utensils and the like. Polyethylene may have a tensile strength of 2,000 p.s.i. or higher and a tensile elongation of 300 percent or higher.

In accordance with the present invention, there is provided a complete process for obtaining high conversions of ethylene to high quality polyethylene. The present invention is directed to a non-solvent process of polymerizing ethylene in which a combination free radical catalyst comprising both a low temperature catalyst initiator and a high temperature catalyst initiator is utilized in the presence of particular transfer agents.

Prior to the present invention there have been certain deficiencies in the processes of preparing polyethylene by polymerization of ethylene at elevated temperatures and relatively high pressures. Thus, a polymerization carried out continuously in a tubular reactor using a low temperature initiator, such as lauroyl peroxide, at temperatures in the range of 110°–180° C. produced polyethylene of acceptably high density, but conversions were generally low, of the order of 10 to 12% and almost never greater than 20%; a chain transfer agent utilized in the process was effective in assuring satisfactorily high melt index. Attempts to improve conversions by use of greater amounts of low temperature polymerization catalyst were not effective and resulted in a cheesy product having poor tensile properties. In contrast to the low temperature catalyst, a high temperature catalyst such as oxygen or ditertiarybutyl peroxide, particularly when used in high concentration, was effective in achieving good conversions at fairly high reaction temperatures but the resulting polymer was low in density, and/or poor in tensile properties.

The variety of uses to which polyethylene can be put requires that a commercial producer of the polymer be able to make, at will, polymer having chosen characteristics which may vary over a considerable range depending on the needs of the consumer. The two properties of most importance in the processing and application of polyethylene, other than tensile properties and the absence of grain, are the density and the flow characteristics, the latter commonly being described in terms of the melt index, namely the decigrams polyethylene that can be extruded per minute through an orifice under standard test conditions described in ASTM Method D–1238. The melt index bears a general relationship to molecular weight, in that the higher the molecular weight the lower the melt index all other factors being constant, but is also sensitive to other factors such as extent of branching in the polymer molecule, type of branching, and extent of cross-linking. The density is a fairly direct measurement of crystallinity, the higher the density the higher the percentage of crystallinity in the polymer, and in turn the higher the melting point and the greater the stiffness of the polyethylene. Polyethylene to be suitable for many purposes will have a tensile elongation at break of at least about 300%.

Polyethylene can be produced by subjecting ethylene to the polymerizing action of elevated temperatures while maintained at relatively high pressures. The ethylene polymerization reaction is comparatively slow in the absence of catalyst. Various free radical promoting catalysts can be used, e.g., organic and inorganic peroxytype catalysts, azo-type catalysts, and the like. One of the simplest and most effective catalysts is free oxygen, but its use presents difficult problems of control. Since the first disclosure of polyethylene and its manufacture at high pressures, see Fawcett et al., U.S. Patent 2,153,553, and a similar process directed to use of oxygen as catalyst, see Perrin et al., U.S. Patent 2,188,465, a voluminous literature has developed on the manufacture of polyethylene and on properties and uses of polyethylene. Practically the entire literature on processes for producing polyethylene is in the form of patents, but each of these appears to be directed only to a particular feature or improvement. Details of operative processes for producing polyethylene have been very closely guarded industrial secrets. Only the general effect on general polymer qualities, especially molecular weight, of different reaction variables, such as temperature, pressure and oxygen content, and the use of various reaction media such as aqueous systems, organic solvents, gaseous diluents and the like, have been indicated in the patent literature. Those skilled in the art have not been advised of any particular process that would permit the efficient and continuous production of polyethylene over a long period of time and having all properties of the polyethylene acceptable for commercial usages. To the best of our knowledge there is no patent, or combination of patents, which reveals how to control simultaneously the melt index, grain, and density of polyethylene in a free oxygen-catalyzed continuous flow process.

We have conducted a great deal of research on the production of polyethylene by the polymerization of ethylene at high pressures by continuous procedures, and are only too well aware of the aforesaid deficiencies of the prior art disclosures. Theoretical considerations would indicate that in order to obtain practical reaction rates and production rates, reaction mixture should be passed continuously through an elongated tube, permitting rapid removal of the heat which is liberated by the highly exothermic polymerization of ethylene. Considerations of heat transfer, taken in conjunction with the fact that the polymerization reaction is highly exothermic and must be carefully controlled, make it desirable that the reaction tube be of comparatively small diameter, and this is especially so when the conversion per pass is fairly high. As a result the ratio of the length of the reaction tube to the internal diameter of the reaction tube is desirably quite high, for example, at least about 300:1 to 500:1, and often on up to 1,000:1 and higher. For instance, tubes ranging in internal diameter from 2 inches or larger to ⅛ inch and in length from 800 feet and longer to 40 feet can be used. However, a large number of major problems are encountered in operating a continuous high pressure process for the polymerization of ethylene in an elongated tube. These problems especially include the following: polymer deposition in the reactor; carbonization; formation of grainy polymer; poor heat transfer; operation at economic conversion; molecular weight control; and density control. Often, a change in one reaction variable to alleviate one of these problems will make another problem more severe. Thus, for example, in order to provide full control of the reaction, it may appear desirable to lower the content of the oxygen catalyst to a low value. If this is done, there is less danger of carbonization or explosive decomposition, but the lowered oxygen content results in the production of polymer having an increased molecular weight at uneconomic conversion. At low catalyst concentrations, flow of polymer through and out of the narrow reaction tube becomes more difficult, and presents another problem in reactor control. Further, a higher molecular weight polymer may not be desired for a given end use and therefore the use of smaller concentrations of oxygen may be undesirable from the viewpoint of product quality. Such complicated inter-relationships are found in considering any of these reaction variables.

It has now been found that by a combination of both low temperature and high temperature initiators in a nonsolvent continuous process along with particular chain transfer agents, it is possible to obtain good conversions, e.g., of the order of 30 to 35%, of polyethylene having good density, e.g., of the order of 0.92 to 0.93, by continuously flowing through a small diameter, highly elongated tube a reaction mixture initially consisting essentially of ethylene, a combination of peroxide initiators, or at least one peroxide initiator and free oxygen, the said initiators or initiator and oxygen having significantly different initiation temperatures, and a small amount, e.g., no more than about 15 mole percent based on the ethylene, of particular chain transfer agents such as acetone, cyclohexane, or other saturated hydrocarbon of 3 to 6 or more carbon atoms.

In one aspect the present invention can be considered as a procedure in which ethylene is continuously polymerized in the presence of transfer agent as described above utilizing a high temperature peroxygen or oxygen catalyst under high temperature conditions suitable for obtaining high conversion with some loss of desirable polymer properties, and the additional use therein of a low temperature peroxygen catalyst to obtain a substantial portion of polymerization while being heated up to the high temperature, thereby improving the properties of the resulting polymer and possibly also improving conversion.

The present invention utilizes a mixture of peroxygen catalysts having significantly different decomposition temperatures; or a mixture of one or more peroxygen catalysts with oxygen or an oxygen containing gas, in which there is a significant difference in the effective polymerization initiating temperatures of at least two of the initiators present. The peroxygen compounds contemplated are organic peroxides having a decomposition temperature at a half-life value of 1 minute of from about 110° C. to 260° C., and preferably no greater than about 200° C. Representative peroxygen catalysts, together with their decomposition temperatures, which can be employed in catalyst mixtures according to the present invention are set forth below:

| Peroxide: | Temp. (° C.) (for $t\frac{1}{2}=1$ min.) |
|---|---|
| 2,4-dichlorobenzoyl peroxide | 112 |
| Caprylyl peroxide | 114 |
| Lauroyl peroxide | 115 |
| t-Butyl peroxyisobutyrate | 131 |
| Benzoyl peroxide | 133 |
| p-Chlorobenzoyl peroxide | 133 |
| Di-t-butyl diperphthalate | 159 |
| t-Butyl peracetate | 159 |
| t-Butyl perbenzoate | 166 |
| Dicumyl peroxide | 171 |
| t-Butyl hydroperoxide (commercial) | 179 |
| Methyl ethyl ketone peroxide | 182 |
| Di-t-butyl peroxide | 193 |
| p-Menthane hydroperoxide | 216 |
| Pinene hydroperoxide | 229 |
| Cumene hydroperoxide | 255 |
| 2,5-dimethylhexane-2,5-dihydroperoxide | 257 |

It will be possible to obtain some of the advantages of the present invention by use of a catalyst combination having a decomposition temperature differential of 10 or so centigrade degrees, but to have a really effective combination it will be necessary to employ catalysts having a temperature differential of 20 centigrade degrees or more. The half-life referred to above is calculated:

$$t\frac{1}{2}=\frac{0.693}{k_d}$$

in which $k_d$ is the rate constant for the decomposition of the peroxide to the free radical. For the purpose of determining suitable catalyst combinations in the above-described manner, the decomposition temperature of oxygen can be considered as 160° C., actually in the case of peroxygen compounds and free oxygen, a different phenomenon may be involved in that it may well be that peroxygen compounds catalyze decomposition of the oxygen.

It will be recognized that any organic peroxygen catalyst capable of generating free radicals in the above described temperature ranges can be employed in the combined catalysts utilized in the present invention. It will be noted that the above representative list of examples includes among others aromatic and aliphatic peroxy compounds and compounds containing such radicals as alkylperoxy, arylperoxy, aralkylperoxy, acylperoxy, cycloalkylperoxy, alkarylperoxy, and includes branched chain as well as straight chain alkyl and other aliphatic radicals, and also includes both exocyclic and endocyclic ring compounds, and contemplates peracids and their esters, as well as the organic peroxides and hydrogen peroxides.

A few representative examples of the initiator combinations which can successfully be employed in the present invention are: lauroyl peroxide and oxygen, lauroyl peroxide and ditertiarybutylperoxide, benzoyl peroxide and oxygen, benzoyl peroxide and ditertiarybutyl peroxide, lauroyl peroxide and tertiarybutylperbenzoate, benzoyl peroxide and tertiarybutyl hydroperoxide, benzoyl peroxide and dicumyl peroxide, benzoyl peroxide, oxygen and tertiarybutyl perbenzoate, etc. The relative amounts of the initiators can vary considerably, but ordinarily it is necessary to have an initiator constitute at least about 10 molar percent of the catalyst combination if it is to have any very significant effect on the reaction, and it is generally desirable to have each of two catalysts constitute at least ⅓ of the catalyst combination on a molar basis.

The catalysts employed in the present invention will ordinarily be added along with the ethylene in the inlet end of the reactor, and the lack of necessity for any later catalyst injection is one of the advantages of the invention; however, if desired one or more catalysts can be added at one or more later points along the reaction tube.

Ordinarily peroxygen catalysts in a continuous ethylene reactor are employed in concentrations of the order of 7 to 15 or in some cases possibly 20 or so micromols per mole of ethylene feed. The present invention, however, makes it feasible to employ larger total amounts of catalyst, such as 7 to 15 or 20 micromols of each of the peroxygen compounds or oxygen employed in the reaction. Thus in one aspect, the present invention provides for the employment along with a transfer agent in a continuous polymerization system of higher concentrations of a combined catalyst than could feasibly be employed with a single catalyst under the same conditions or to produce polymer of the same quality—as measured, for example, by density.

The chain transfer agents required in the present invention are lower saturated hydrocarbons having at least 3 carbon atoms, or acetone; the agents individually or in admixture with each other are ordinarily used in an amount from about 0.3 to 15 mole percent based on ethylene, and the individual transfer agents are suitably employed according to the schedule:

|  | Mole percent |
| --- | --- |
| Acetone | 0.5 to 15 |
| Propane | 0.5 to 15 |
| n-Butane | 0.5 to 15 |
| i-Butane | 0.3 to 10 |
| Pentanes | 0.3 to 10 |
| Hexanes | 0.3 to 10 |

Use of amounts of these hydrocarbons appreciably greater than those stated results in the production of low molecular weight polyethylene waxes. The process does not use reaction media such as water and/or inert liquid organic solvents which have been taught to be essential for operation of small diameter, commercial reactors. The process presently under consideration is a dry, or nonsolvent process which does not employ water and/or liquid organic solvents in large amounts within the reaction tube to improve mobility or serve as a heat transfer medium therein. Small amounts of such solvents or water may at times be used as solvents for the addition of peroxides or the like, but will not be employed in any large amounts, but only up to 1% or 2%, and not as much, for example, as 5% and never, for example, as much as 10% by weight of the ethylene feed. It will also be realized that it is necessary to employ the above-designated transfer agents herein which have a marked chain transfer effect, and various organic solvents which may have some incidental transfer effect do not meet the requirement for a suitable chain transfer agent in the present invention. It will be realized that there is considerable advantage in avoiding the use of water or solvents in the polymerization, particularly in avoiding the separation of large volumes of water or solvent from the polyethylene product.

The initial reaction mixture consists essentially of ethylene, acetone or $C_3$–$C_6$ saturated hydrocarbon, including stable cyclic saturated hydrocarbons, and a combination of peroxygen catalysts, or one or more peroxygen catalysts and oxygen; i.e., while preferably no other material is present, it is permissible if desired or more convenient to include small amounts, e.g., not over one weight percent nitrogen, methane, ethane, hydrogen, or other light gases of such nature and in such amounts that do not adversely affect the course of the polymerization and the quality of the polyethylene product. The general principles of the invention can likewise be used to make copolymers of ethylene with ethylenically unsaturated monomers copolymerizable therewith, for example, unsaturated esters such as vinyl acetate, the alkyl acrylates and methacrylates, e.g., methyl methacrylate, vinylidene fluoride, vinyl ethers, and the others known to the art, with suitable adjustments in proportion of materials and conditions.

The lower saturated hydrocarbon or acetone content, the oxygen content, the temperature, and the pressure, all have their individual effects on product density and product melt index, which effects are as follows:

|  | Transfer Agent Content | Oxygen Content | Temperature | Pressure |
| --- | --- | --- | --- | --- |
| Increased density polyethylene. | higher | lower | lower | higher. |
| Increased melt index polyethylene. | higher | higher | higher | lower. |

A particularly desirable feature which can be employed in carrying out the present invention is that of imposing on the flowing reaction mixture marked flow pulses at regular time intervals of such frequency and magnitude as to keep the tube essentially free from obstructing accumulations of polymer on the inner walls thereof, while maintaining suitable average temperature within the reaction tube by indirect heat exchange, for a dwell time not appreciably extended beyond the time during which active peroxygen or oxygen catalyzed polymerization is occurring. The frequency of the imposed flow pulses, the duration of the various phases of a single cycle, and the magnitude of the pulses, will of course be somewhat different for various reaction systems and conditions, but will be chosen by a suitable series of tests to prevent irregular changes in pressure drop and flow rate resulting from accumulations of polymer. In most cases the frequency should be at least once every two minutes, and much preferably once every fraction of a minute, such as once every 45 seconds to once every second. Once every few seconds, say once every 3 to 10 seconds, is by far the preferred frequency in the practice of this feature and gives much superior results to those obtained when the frequency is say once every 20 seconds. Thus, a frequency of less than 20 seconds is preferred. For each flow pulse, the resulting increased velocity of the reaction mixture through the tube should be from 2 to 10 or more times the standard operating velocity. It is much preferred that the flow pulses be accompanied by corresponding pressure pulses, in which case they can be designated pressure-flow pulses, and the magnitude can be measured by the increase in velocity as just mentioned and/or the change in pressure (as measured at the inlet end of the reactor tube) for each such pressure-flow pulse should be from 5 to 25 percent of the standard operating pressure.

The pressure flow pulses are preferably obtained by operation of the "let-down" valve at the exit end of the reaction tube. It may be mentioned here that the usual flow system involves compressors, pumps, and/or intensifiers for bringing the ethylene reactant up to the exceedingly high reaction pressure, means for thoroughly mixing with the ethylene the chosen quantities of combined catalyst and paraffin hydrocarbon, means for passing the mixture of same and ethylene into the tubular reactor proper, a preheater first being used and/or the forepart of the reaction tube being used as preheater, and a let-down valve at the exit end of the reaction tube through which the final reaction mixture of ethylene plus polymer flows into a lower pressure polymer separation zone. The pressure on the final reaction mixture may be and preferably is normally dropped very severely at this outlet valve, for example, from the standard reaction pressure within the range of about 15,000 or preferably about 25,000 to about 50,000 pounds per square inch absolute in the reaction tube down to a pressure of say 500 to 5,000 pounds per square inch in the separation zone. As indicated above, the flow pulses are advantageously effected by suitable manipulation of the let-down valve. One skilled in the art, having had the benefit of the present disclosure, will readily be able to devise various methods of operating this valve to impose the desired pressure-flow pulses on the reaction system. In all cases where the pulses are imposed by let-down valve operation, the valve will be sharply opened so as to cause a very rapid drop in pressure in the reaction tube. This, of course, results in a corresponding increase in the pressure drop across those portions of the tube in which flow is most restricted by polymer accumulation and an increase in flow rate of reaction mixture through said portions and for that matter through all portions of the tube. After this occurs to the chosen extent, the valve is then immediately closed, partially or completely. As soon as the pressure in the reaction tube builds back to the former pressure, which is the standard operating pressure of the process, or shortly thereafter, the let-down valve is again suddenly opened wide as before, starting a new cycle. The procedure described is continued indefinitely. The time elapsing from a given portion of the cycle to the same portion of the next cycle is, of course, termed the frequency of the cyclic operation.

Less, preferably, but permissibly, somewhat similar pulses can be imposed by maintaining a steady outlet flow from the reaction tube and varying the inlet flow conditions, as by suitable manipulation of the pumps that charge the reaction mixture into the tube. Other aspects of this flow impulse feature useful with the present invention are described in the copending application of John D. Calfee, William R. Richard, Wallace G. Bir and Norval E. Jones, S.N. 712,339, filed on January 31, 1958, and in U.S. Patent No. 2,852,501 to William R. Richard, Jr., Robert K. Stewart and John D. Calfee, assignors to Monsanto Chemical Company, issued September 16, 1958.

The following examples are illustrative of the present invention.

EXAMPLE 1

In a small reactor tube equipped with an oil jacket, ethylene was polymerized at oil temperatures of 140 to 200° C. in the presence of acetone as transfer agent and with mixed benzoyl peroxide and ditertiarybutyl peroxide as catalyst, with the following results, shown in comparison with tertiary butyl perbenzoate as a single catalyst.

*Table I*

| Pressure (p.s.i.) | Wt. Percent Acetone [1] | Parts Initiator [1] (p.p.m.) | Conversion Percent | Tensile Break, p.s.i. | Density (g./cc.) |
|---|---|---|---|---|---|
| 22,000 | 4.4 | BzO, 107; DTBP, 65 | 34 | 1,850 | 0.924 |
| 22,000 | 3.1 | BzO, 97; DTBP, 58 | 32 | 1,550 | 0.923 |
| 27,000 | 4.6 | TBPB, 72 | 18 | 2,200 | 0.929 |

[1] Based on ethylene feed.

It is apparent that the use of mixed peroxides of different decomposition temperature along with a transfer agent makes possible much higher conversions under comparable reaction conditions, or even at lower pressures. As in the present example, it is sometimes advantageous to maintain the oil at one temperature for the upstream section of the reaction tube, and another temperature for the downstream section, thus in effect having two reaction zones, or more if preferred.

EXAMPLE 2

Utilizing cyclohexane, 5.8 weight percent, as transfer agent in the reactor of Example 1 at oil temperature of 180 to 230° C., and 5 p.p.m. of benzoyl peroxide with 30 p.p.m. of ditertiarybutyl peroxide, a conversion of 24% was obtained. Larger amounts of the mixed catalyst would give even higher conversion.

EXAMPLE 3

In a 775-inch tubular reactor having a 5/16-inch inside diameter, ethylene was polymerized at pressures of 35,000 p.s.i. and at reaction temperatures varying from 120 to 220° C. Utilizing a lower saturated hydrocarbon as transfer agent and a mixture of peroxides as catalyst with an impulse flow frequency of every 3.8 seconds at a magnitude of 2600 p.s.i. gave polyethylene of density, 0.9275 gram/cc. Under the foregoing conditions t-butylperbenzoate and benzoyl peroxide in amounts respectively of 11 and 6 micromols/mol of ethylene gave a conversion of 15.8% and the polyethylene product had tensile elongation at break of 270%. When the amounts of t-butylperbenzoate and benzoyl peroxide were changed to 11 and 8½ micromols/mol, the conversion was raised to 19.5% and the polyethylene product of comparable melt index to the previous product had tensile elongation at break of 410%. The fact that only a slight change in the amount and ratio of the peroxides causes improved conversion and change in polymer properties is a positive indication of the importance of the mixed catalyst.

EXAMPLE 4

Utilizing the reactor of Example 3 with a dwell time of 109 seconds under conditions to prepare polyethylene of density 0.9262 gram/cc., a single peroxide catalyst, t-benzoyl peroxide in an amount of 15 micromols per mol of ethylene, gave a conversion of only 12.8%, and the tensile elongation at break of the polyethylene product was only 67%.

EXAMPLE 5

Utilizing a dwell time of about 110 seconds ethylene was polymerized at a reaction temperature of 120 to 215° C. in the presence of a lower saturated hydrocarbon transfer agent with 20 parts per million by weight of oxygen, based on the ethylene feed, and 15 micromols/mol of benzoyl peroxide, also based on the ethylene, as the mixed catalyst. Polyethylene was produced with conversion of 22% and had density, 0.9265, and tensile elongation at yield of 425%. A substantial part of the foregoing polymerization, as determined from the internal temperatures measured in the reaction tube, took place at reaction temperatures of 120 to 170° C., and the peak reaction temperature in the latter half of the tube was only 215° C. In contrast to this, a single catalyst would ordinarily have no effective polymerization occurring in large parts of the reaction tube, as indicated by temperature data; for example, with t-butyl perbenzoate as a single catalyst, there will often be practically no polymerization in the upstream portion of the reaction tube, with temperatures of the order of 50 to 70° C., while in the downstream portion of the tube there is danger of the peak temperature going high enough to cause substantial carbonization. In one aspect, the present invention can be considered as utilizing catalyst mixtures to effect a more smooth reaction temperature-reactor time curve, i.e., to have a substantial portion of the polymerization occur at the lower temperatures around 120 to 170° C., and to also have a substantial portion at temperatures above 170° C. but without any sharp, high peaks in the temperature curve. In the present reaction the temperature has been controlled to the extent that the peak temperature is only 215° C., while polyethylene can be polymerized at temperatures as high as 320° C. It will be realized that it would be feasible to conduct the polymerization at considerably higher temperatures while retaining a smooth reaction temperature curve without reaching undesirably high peak temperatures, and to obtain the even higher conversions associated with higher reaction temperature. Dwell times in the process are ordinarily no greater than 120 seconds.

EXAMPLE 6

In a tubular reactor, ethylene was polymerized at a feed rate of about 150 lbs./hour at pressure of 22,000 p.s.i. in the presence of transfer agent with the reaction zone heated by a jacket maintained at 230° C. The comparative data for runs employing lauroyl peroxide alone, or lauroyl peroxide in combination with ditertiarybutyl peroxide, is reported below:

| Jacket Temps., °C. | | Propane Conc., mol percent | Initiators | | | Conversion percent |
|---|---|---|---|---|---|---|
| Preheat | Initiator | | Type | Ratio | Conc., p.p.m. | |
| 110 | 170 | 7.1 | L₂O₂ | -------- | 237 | 8.1 |
| 230 | 230 | 7.5 | L₂O₂ | -------- | 105 | 5.3 |
| 230 | 230 | ¹ 4.5 | L₂O₂/ | 1/1 | 160 | 19.4 |

¹ It was unnecessary to employ as much transfer agent in this run due to the larger amount of effective catalyst present which has some tendency to lower molecular weight, and also due to the presumably higher reaction temperature.

In the practice of the present invention it is advantageous to limit the dwell time to not more than twice the time during which active polymerization is occurring, and further advantageous to have preferably not more than 30 percent at the most of the total dwell time in the reactor occurring beyond the point of peak temperature attainment, in order that the total dwell time is not appreciably extended excessively beyond the time during which free radical-catalyzed polymerization is occurring. It will probably be advantageous to have at least about one-third of the polymerization occur in the first half of the reaction tube and also at least about one-third in the last half; or, for example, have at least about one-third of the polymerization occur below 170° C., and at least about one-third above that temperature.

Ordinarily the dwell time will not exceed 120 seconds, and will often be less, perhaps not over 50 seconds. However, in some cases, especially where larger reaction tubes of up to say 2 or 3 inches or more internal diameter are used and/or catalyst is introduced not only at the beginning but also at one or more points along the length of the tube, considerably longer dwell times, even up to 5 minutes or more, can be employed.

Within the fairly wide ranges of reaction conditions taught herein we often prefer to operate within the following ranges to obtain polyethylene of melt index 0.05 to 10 and density 0.920 to 0.924: pressure 32,000–37,000 p.s.i., dwell time 40–60 seconds, mixed catalyst content 17–35 micromols/mol ethylene, propane 1.8–4.2 mole percent, pulse frequency 3–10 seconds, pulse intensity 2,000–4,000 p.s.i. drop in pressure at inlet of reaction tube, jacket temperature 180–230° C., peak internal temperature 225–300° C.

It will be realized from the foregoing description and examples that the particular catalysts in the mixed catalysts and the amounts and proportions thereof must be selected and coordinated with all of the other variables in the reactants, process conditions and process controls pertaining to the claimed process, to achieve desired combinations of higher conversions and polymer quality. It is believed to be apparent from the foregoing, however, that the use of the disclosed catalyst combinations provides a method of achieving a marked improvement over the combination of conversions and polymer qualities which could be obtained by use of a single catalyst under comparable conditions.

We claim:
1. In the preparation of polymers of ethylene by a continuous non-solvent process, the improvement which comprises continuously flowing through a small diameter, highly elongated tube a reaction mixture comprising ethylene, a chain transfer agent selected from the group consisting of saturated lower hydrocarbons having at least 3 carbon atoms and acetone, the said chain transfer agent being employed in an amount from about 0.3 to 15 mole percent based on ethylene and in the absence of any more than 2% by weight based on ethylene of other solvent and a combination free radical catalyst comprising mixtures of catalysts of decomposition temperatures differing by at least 20 centigrade degrees and in the range from 110° C. to 200° C., the catalysts being selected from the group consisting of organic peroxygen compounds and oxygen and comprising lauroyl peroxide and ditertiarybutyl peroxide, and maintaining the pressure in the reaction tube in excess of about 15,000 pounds per square inch and carrying out the actual polymerization in the range of 120° to 300° C. and over a broader temperature range than would obtain with use of a single catalyst, utilizing indirect heat exchange for control of same, and adjusting the amounts and ratio of catalyst in line with other variables in the polymerization to obtain good polymer quality along with high conversion of ethylene to the polymer, the catalysts being present in amounts such that each constitutes at least 10 molar percent of the catalyst combination on a molar basis and the total catalyst is 17 to 35 micromols/mole of ethylene, and being selected so as to obtain a substantially large portion of the polymerization at temperatures in the range of 120 to 170° C., and also a substantially large portion of the polymerization at temperatures well above 170° C., while maintaining a relatively smooth reaction as indicated by the temperature-time curve for the reaction being fairly smooth without a peak radically higher than the rest of the curve.

2. In the preparation of polymers of ethylene by a continuous non-solvent process, the improvement which comprises continuously flowing through a small diameter, highly elongated tube a reaction mixture comprising ethylene, a chain transfer agent selected from the group consisting of saturated lower hydrocarbons having at least 3 carbon atoms and acetone, the said chain transfer agent being employed in an amount from about 0.3 to 15 mole percent based on ethylene and in the absence of any more than 2% by weight based on ethylene of other solvent and a combination free radical catalyst comprising mixtures of catalysts of decomposition temperatures differing by at least 20 centigrade degrees and in the range from 110° C. to 200° C., the catalysts being selected from the group consisting of organic peroxygen compounds and oxygen, and comprising benzoyl peroxide and t-butylperbenzoate, and maintaining the pressure in the reaction tube in excess of about 15,000 pounds per square inch and carrying out the actual polymerization in the range of 120° to 300° C., and over a broader temperature range than would obtain with use of a single catalyst, utilizing indirect heat exchange for control of same, and adjusting the amounts and ratio of catalysts in line with other variables in the polymerization to obtain good polymer quality along with high conversion of ethylene to the polymer, the catalysts being present in amounts such that each constitutes at least 10 molar percent of the catalyst combination on a molar basis and the total catalyst is 17 to 35 micromols/mole of ethylene, and being selected so as to obtain a substantially large portion of the polymerization at temperatures in the range of 120 to 170° C., and also a substantially large portion of the polymerization at temperatures well above 170° C., while maintaining a relatively smooth reaction as indicated by the temperature-time curve for the reaction being fairly smooth without a peak radically higher than the rest of the curve.

References Cited in the file of this patent

UNITED STATES PATENTS

| | | |
|---|---|---|
| 2,482,877 | Schmerling | Sept. 27, 1949 |
| 2,557,256 | Brubaker | June 19, 1951 |
| 2,592,526 | Seed | Apr. 15, 1952 |
| 2,646,425 | Barry | July 21, 1953 |
| 2,683,141 | Erchak | July 6, 1954 |
| 2,852,501 | Richard et al. | Sept. 16, 1958 |
| 2,921,059 | Guillet et al. | Jan. 12, 1960 |

FOREIGN PATENTS

| | | |
|---|---|---|
| 770,507 | Great Britain | Mar. 20, 1957 |

OTHER REFERENCES

Mageli et al.: "Modern Plastics," March, 1959, pages 135–144 (effective date March 13, 1958, see note page 135).

UNITED STATES PATENT OFFICE
CERTIFICATE OF CORRECTION

Patent No. 3,142,666    July 28, 1964

Oliver de S. Deex et al.

It is hereby certified that error appears in the above numbered patent requiring correction and that the said Letters Patent should read as corrected below.

Column 9, in the table, under the heading, "Type", last line thereof, for "$L_2O_2$/" read -- $L_2O_2$/DTBP --.

Signed and sealed this 8th day of December 1964.

(SEAL)
Attest:

ERNEST W. SWIDER
Attesting Officer

EDWARD J. BRENNER
Commissioner of Patents